INVENTORS
GEORGE E. PHILLIPS
PAUL E. STRAIGHT

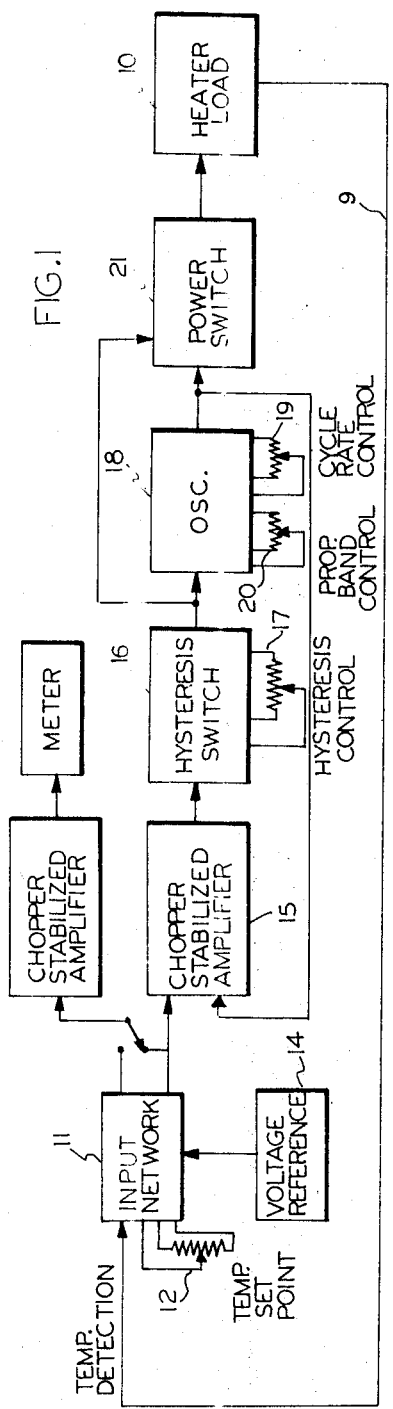
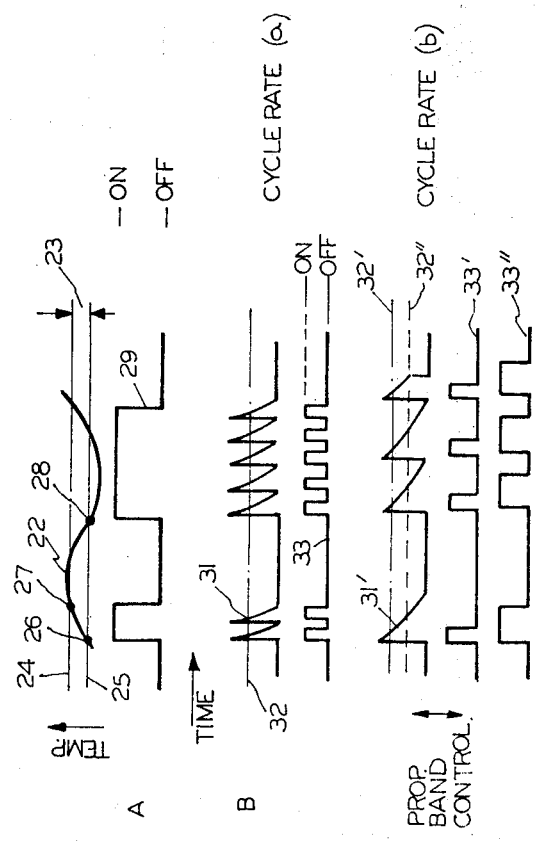

BY Lawrence R. Brown

ATTORNEY

… … … … … … … … … … … … … … … … … … … … … … … … … … … … … … … … … … … … … … … … … … … … … … … … … … … … … … … … … … …

United States Patent Office 3,523,182
Patented Aug. 4, 1970

3,523,182
VARIABLE CYCLE RATE AND DUTY CYCLE TEMPERATURE CONTROLS
George E. Phillips and Paul E. Straight, Fairmont, W. Va., assignors to Electronic Control Systems, Inc., Fairmont, W. Va., a corporation of West Virginia
Filed Nov. 7, 1967, Ser. No. 681,147
Int. Cl. H05b 1/02
U.S. Cl. 219—501                                10 Claims

ABSTRACT OF THE DISCLOSURE

An electronic temperature control system employs a hysteresis device which turns on and off a heater source at different temperatures in a preselected range of actual temperatures detected. This produces a variable duty cycle for the heater, which additionally is cycled on and off during the on duty cycle by an oscillator. The oscillator duty cycle is also controlled by means of a current source control to a field effect transistor coupled as a relaxation oscillator. This gives a wide range of control conditions including duty cycles and cycle rates selectable for different load and variation conditions.

---

This invention relates to electronic control apparatus and, more particularly, it relates to controllers which cyclically switch a heater unit on and off in response to variations in temperature.

Presently known electronic temperature control systems are mainly dependent upon mechanical modulators and in many cases, are resistance sensitive and require very careful compensation of lead lengths from thermocouples and like temperature detectors.

Furthermore, prior art devices have not provided adequate controls to operate universally with different heating requirements under different conditions of temperature change, particularly when very close tolerances are required to operate in a narrow temperature range.

It is therefore an object of the invention to provide improved electronic temperature control means.

Another object of the invention is to provide an instrument of the universal type providing for variations in controls to cover a wide range of conditions encountered in temperature changes and heaters.

In accordance with this invention therefore, the temperature control system includes an oscillator which cyclically controls the heater element during periods that the temperature leaves a predetermined range. By control of the cycle rate and duty cycle a significant variation of conditions can be covered in a single standard instrument.

Further details, objectives and features of advantages of this invention will be found throughout the following specification, which refers to the accompanying drawings, wherein:

FIG. 1 is a block system diagram of a temperature control system constructed in accordance with this invention.

FIG. 2 is a waveform display illustrating the mode of operation of different embodiments of the invention.

Figure 3:
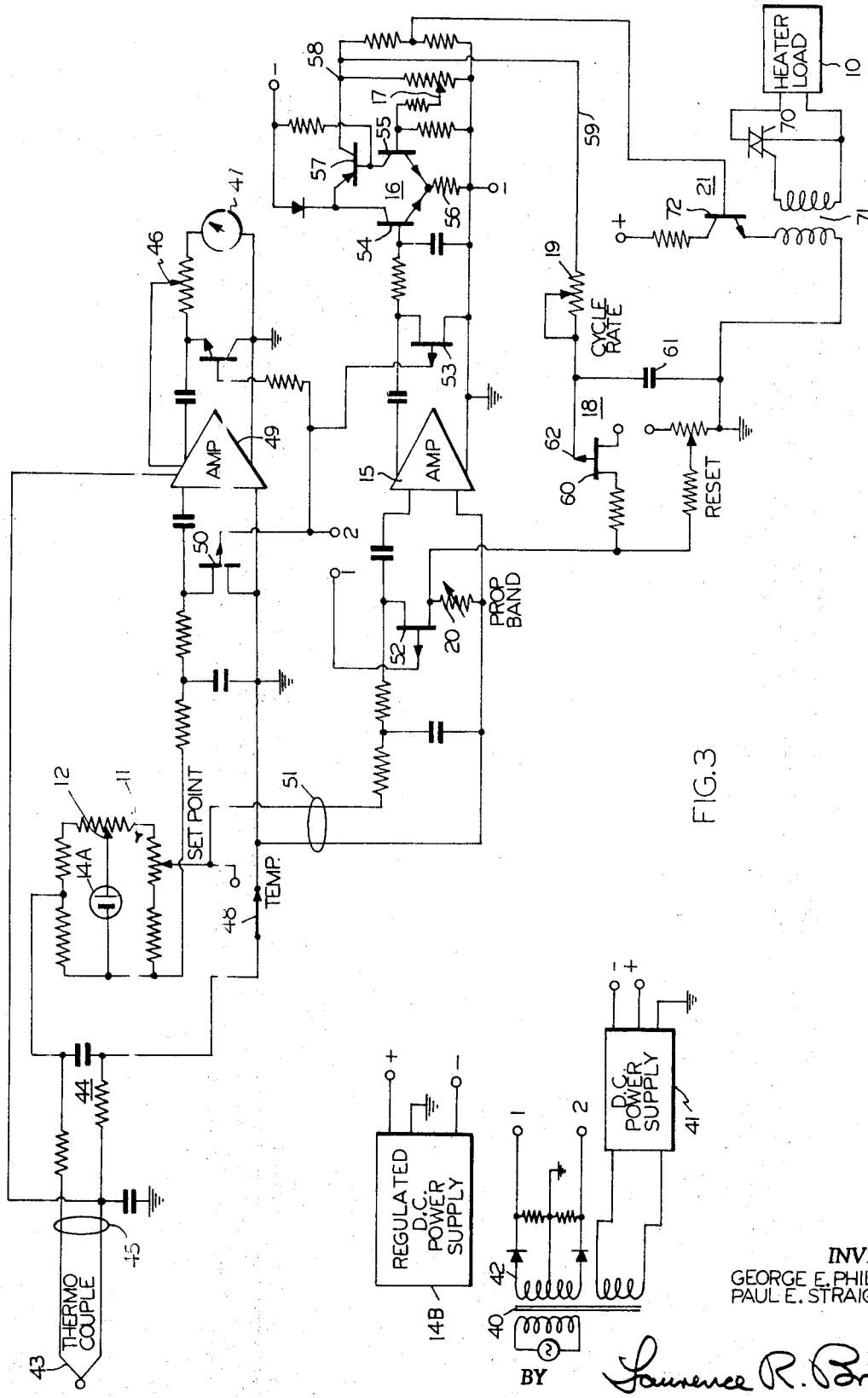
FIG. 3 is a schematic circuit diagram of an electronic temperature control system embodying the invention.

The temperature control system of FIG. 1 provides for detection of the temperature at the heater load device 10, which is fed back by lead 9 to the input network 11. Part of this network is a temperature set point control 12 which permits a choice of the temperature which the heater load 10 controls. The detected temperature is converted into an electrical signal, such as by a thermocouple, and compared with a standard voltage reference 14, to provide an error or difference signal. Since this error signal is of direct current of low magnitude, it is amplified in the chopper stabilized amplifier circuit 15 with a feedback loop from oscillator 18. The amplifier output is reconverted to direct current at the hysteresis switching circuit 16. The latter circuit drives both the power switch 21 and oscillator 18.

In the hysteresis switching 16, a selection is made by hysteresis control 17 of a hysteresis band, and the switching circuit then respectively turns on and off the following oscillator circuit 18 at the two different limiting temperatures in the hysteresis range.

The oscillator 18 of itself has further controls 19 and 20 for respectively adjusting the cycle rate and the proportional band or duty cycle. The amount of power applied to the load is then modulated by power switch 21 in accordance with the on-off characteristics of the oscillator circuit 18. The diagrams of FIG. 2 represent the nature of controls that may be used to effect the desired operation and range of controls for various requirements of temperature stability at temperatures within a wide range and for control of different heater load circuits.

Thus, in FIG. 2A is a representation of a slowly varying temperature 22 which is to be stabilized. In any practical system we may assume that there is a time lag between application or termination of controls and the ability to change temperature as shown by waveform 22. The band 23 is the hysteresis band set by control 17, as variations occur from the set point temperature 24. This band 23 represents the on-off control threshold levels but is related to the proportional band control to be described later.

Assume that the hysteresis band here is set below the temperature set point 24. The hysteresis switch can then detect higher temperature level 24 and the lower temperature level 25, and if desired, can indicate by a lamp or the like when these limits are reached. Assume that the power is turned on at level 25 and off at level 24, and starting at turn on position 26 the temperature will increase until the heater is turned off at 27, and will not be turned on until again it reaches point 28, etc. This results in a control waveform 29 having a duty cycle dependent upon the detected temperature afforded by the hysteresis switch.

This waveform is further modulated by the waveform of oscillator 18 as shown in FIG. 2B. Assume the oscillator is a relaxation oscillator with a maveform 31, 31', etc. depending upon the cycle rate adjustment. Thus, the oscillator further modulates the heater load power control switch 21 during the on control times directed by the temperature detection system to provide a selected range of cycles such as represented by cycle rates (a) and (b) in the drawing.

If a conduction or threshold level 32 is chosen, it is seen that an ultimate off-on control pattern 33 may be derived for switching heaters on, which will have different duty cycles as represented by patterns 33' and 33" when the threshold level is varied as at 32' and 32". The threshold level control of this embodiment may be replaced by any other suitable control to accomplish the same function, which control is termed generically "proportional band control." It is noted that this mode of temperature controller operation provides extreme flexibility of control with various cyclic rates and duty cycles so that a better control of temperature is attained within precise limits than possible with prior art controls simply turning a heater on and off as the temperature reaches a limit.

As shown in FIG. 3, a preferred embodiment of the invention is schematically represented. Similar reference characters identify the elements hereinbefore described.

The power supply section utilizes transformer 40 in a conventional power supply circuit 41 to supply the operational voltages for the instrument. The section 42 provides a chopper voltage at terminals 1 and 2 referenced in the schematic diagram. Section 14B is a voltage regulator circuit configuration which may be used to produce a reference voltage as referred to at 14A.

The temperature controlled by the heater load circuit 10 is detected by a thermocouple 43 and converted into an electrical direct current signal for impression to network 11 and comparison with the standard voltage reference 14A at a set point designated by potentiometer 12. Any noises picked up in leads 45 are filtered out in section 44. A potentiometer 46 controls the scale setting which will be indicated on meter 47, which is used to display either the set point temperature at which the control system is operated or the actual temperature by means of switch 48. A separate chopper stabilized amplifier 49 is used in the meter circuit with an input field effect transistor 50 chopper. The input circuits of this arrangement are higher impedance and therefore the circuit and system are not critically responsive to the resistance in the thermocouple leads 45, as is the case with many prior art systems.

Switch 48 is set in the normal control cycle to feed the error signal to amplifier 15 through leads 51. Both the input and output circuits of this amplifier are chopper stabilized by the field effect transistors, which comprise modulator 52 and demodulator 53. Thus, the signal voltage in direct current amplified form appears at switching transistor 54 which has a common emitter connection with switching transistor 55 through resistor 56. Output transistor 57, therefore, provides the hysteresis characteristic with a range depending upon the setting of potentiometers 12 and 17. Thus, the signal at output lead 58 is similar to that of waveform 29 of FIG. 2 which is further modulated by oscillator 18 by way of lead 59.

The oscillator uses a field effect transistor 60 coupled as a relaxation oscillator to capacitor 61 in the gate electrode lead 62. Because of the extremely high input resistance, a small capacitor can provide long time constant.

This cycler circuit including capacitor 61 and cycle rate resistor 19 is isolated from the proportional band adjustment 20 which varies the source voltage as a function of the temperature signal to give in effect the variable threshold action formerly described. The modulation at circuit position 58 therefore permits control of the heater load with a solid state switch circuit 21 which triggers on and off a triggered type solid state device 70 such as a silicon controlled rectifier through transformer 71 by operation of control transistor 72. A relay may be used to control the load if desired, but it is preferable to remove mechanical contacts in the power circuit.

Accordingly, this invention provides an improved temperature control system utilizing a variable cycle rate and variable duty cycle mode of heater load switching control to achieve a better and more precise temperature control at settings within a significant temperature range.

Those novel features believed descriptive of the nature and scope of the invention are defined with particularity in the appended claims.

What is claimed is:

1. Temperature control apparatus or the like, comprising in combination, a detector providing control signals from changes of a sensed parameter, a load effecting control of said parameter, switch means controlling the load, a network responsive to the detector providing processed control signals representative of variations of said parameter from a predetermined level, a control channel including an oscillator coupling said detector to said switch means to operate said switch means periodically and turn the load on and off at the oscillator frequency, and means turning the oscillator on and off—as a function of said signals representative of variations to cyclically turn the load on and off with a duty cycle derived from the detected variations.

2. Apparatus as defined in claim 1, wherein the control channel includes further switching means with structure introducing a hysteresis effect to control turn on and turn off of the load at different detected levels of said signals representative of variations to establish a duty cycle of load control that corresponds to departures of the load from a predetermined range defined by the hysteresis bond of said further switching means.

3. Apparatus as defined in claim 2, wherein the control channel oscillator includes means for turning the first said switch means on and off within the on portion of said duty cycle at a cycle rate exceeding that of the hysteresis means.

4. Apparatus as defined in claim 3, including means to vary the cycle rate of the oscillator.

5. Apparatus as defined in claim 1, wherein said oscillator for establishing the variable cycle rate comprises a field effect transistor having a gate electrode coupled to a capacitor in a relaxation oscillator circuit, and including a circuit responsive to said detector coupled to said capacitor to establish oscillations when a predetermined range of variation is encountered.

6. Apparatus as defined in claim 5, including a variable potential source coupled to the field effect transistor estabing a corresponding variable cycle rate for the oscillator.

7. Apparatus as defined in claim 2, wherein the further switching means is a circuit having two transistors coupled with a common emitter resistor and an output circuit, an input base circuit for one transistor from a current source variable with the detected variation, and a variable current input base circuit connected to the other transistor to establish the magnitude of different detected signal levels at which the output circuit is switched on and off.

8. Apparatus as defined in claim 1, including an amplifier coupled to said network, indicating means operable by the amplifier to read a network characteristic indicating the predetermined operating level, and means selectively coupling the amplifier to read the actual operating level detected.

9. Temperature control apparatus comprising an oscillator with a field effect transistor having a gate electrode coupled to a capacitor to produce relaxation oscillations, a temperature responsive circuit coupled to the capacitor to establish oscillation only at predetermined temperatures, and heater control means operable from the oscillator at cyclic rates to turn a heater on and off.

10. Apparatus as defined in claim 9, including variable supply means to said transistor for establishing variable duty cycle of the oscillations.

References Cited

UNITED STATES PATENTS

| | | | |
|---|---|---|---|
| 3,107,285 | 10/1963 | Knapp | 219—501 |
| 3,284,721 | 11/1966 | Carlson | 219—50 |
| 3,369,108 | 2/1968 | Strachan | 219—501 |

BERNARD A. GILHEANY, Primary Examiner

F. E. BELL, Assistant Examiner

U.S. Cl. X.R.

307—117; 331—66